Feb. 12, 1963  B. WOLSH  3,077,203
ELECTRONICALLY CONTROLLED BACKWATER VALVE
Filed Jan. 8, 1962  3 Sheets-Sheet 1
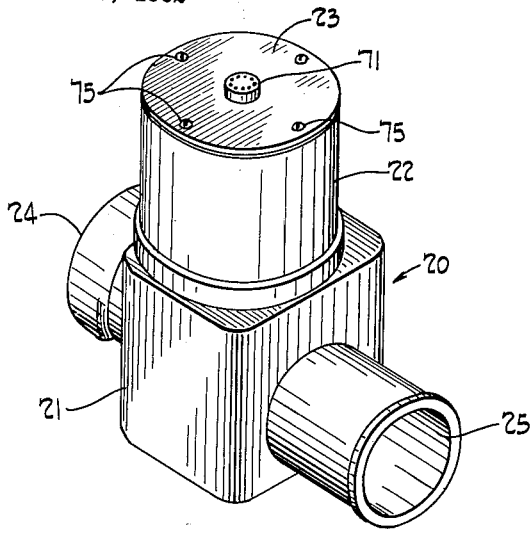
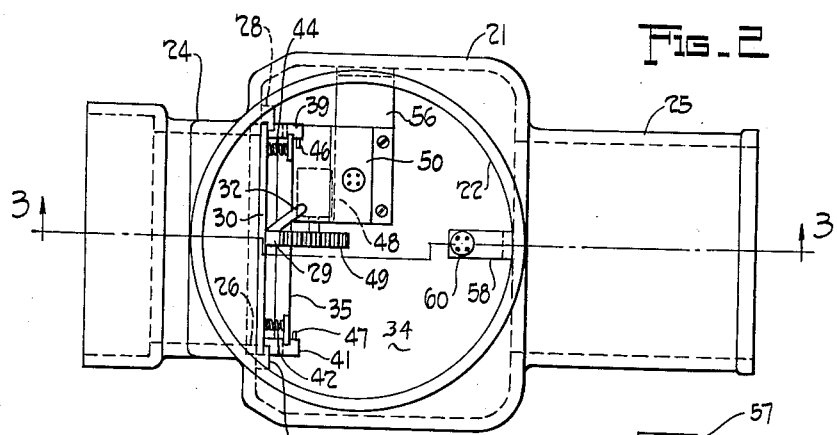
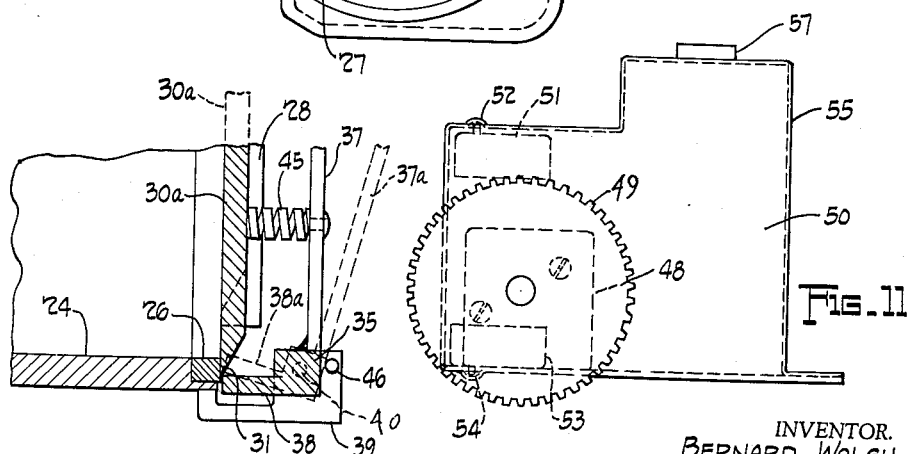
INVENTOR.
BERNARD WOLSH
BY
Sanford Schnurmacher
ATTORNEY.

Feb. 12, 1963  B. WOLSH  3,077,203
ELECTRONICALLY CONTROLLED BACKWATER VALVE
Filed Jan. 8, 1962  3 Sheets-Sheet 2
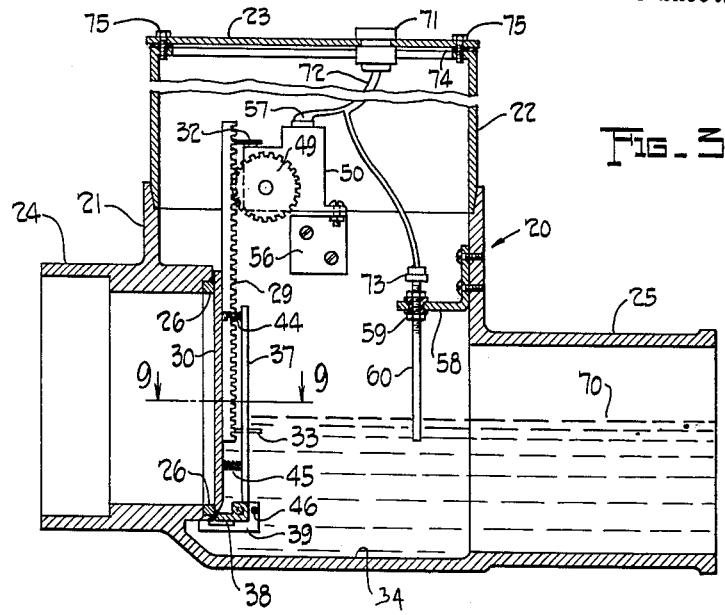
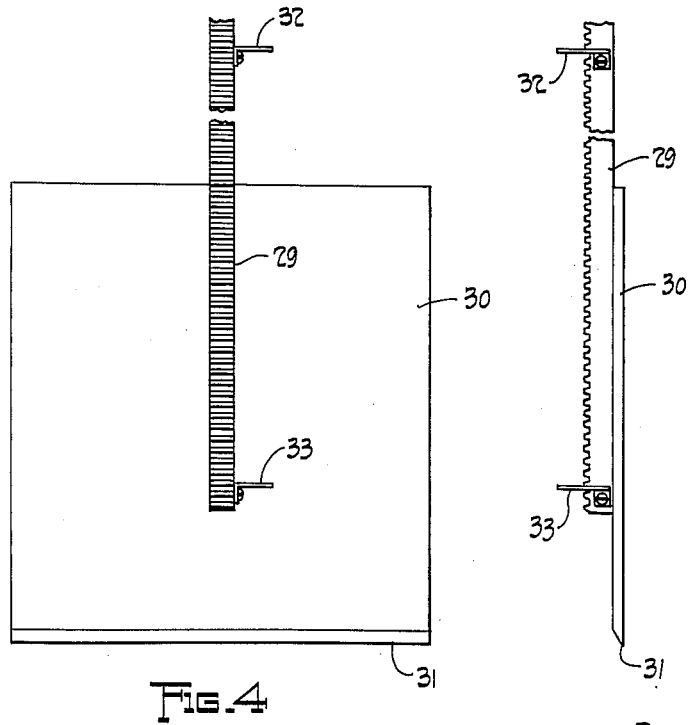
INVENTOR.
BERNARD WOLSH
BY
*Sanford Schnurmacher*
ATTORNEY.

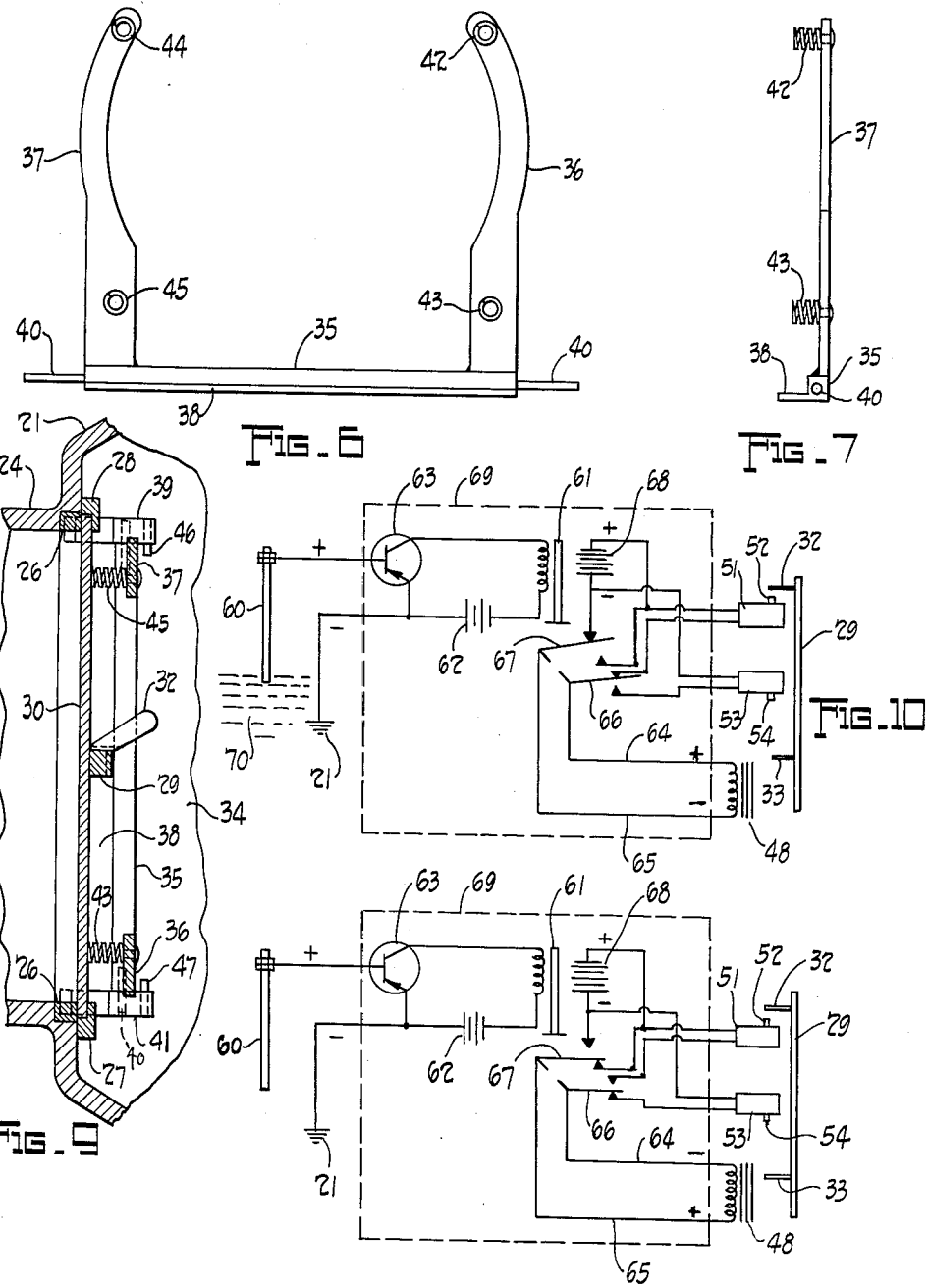

3,077,203
ELECTRONICALLY CONTROLLED BACKWATER
VALVE
Bernard Wolsh, 2350 Fenwood Road,
University Heights 18, Ohio
Filed Jan. 8, 1962, Ser. No. 165,282
5 Claims. (Cl. 137—392)

This invention relates to certain new and useful improvements in flood control means and more especially to a device for preventing basement and other low levels from being flooded by reason of a backing up of the drainage system.

The primary object of this invention is to provide a unitary, electronically controlled, valve gate that will automatically shut, when the sewage level rises to a predetermined level, to prevent back-flow of sewage into a building.

Another object is to provide a valve gate of the type stated that will automatically re-open when the back flow of sewage has ceased, thereby immediately restoring drainage service to the building when the danger of flooding has passed.

Still another object is to provide a valve having a motor driven shear gate that will cut through debris on the valve seat area, as it closes, thereby doing away with the need for periodic inspection and cleaning of the valve.

A further object of the invention is to provide a gate valve of the type stated having a self-activating pressure clamp for positively sealing the gate against its seat when the gate is in its closed position.

Another object is to provide an electrically operated device of the type stated, having a self-contained power source capable of operating the device for as long as 24 hours during a building power failure, such as might occur during a storm.

This invention is not limited to sewage flood control but is applicable to any location where it is necessary to control backflow, or where any other control of a liquid is required. Furthermore, the invention is not limited to new construction but may be installed at small cost in old sewage systems by placing it in the building sewer line near the point where it leaves the building, on its way to the main street sewer.

My invention will be more readily understood from the following description and drawings, in which FIGURE 1 is a perspective view of the electronically controlled backwater valve that is the subject of the invention;

FIGURE 2 is a top plan view of the same with its cover-plate removed;

FIGURE 3 is a longitudinal, sectional view of the same taken along the line and in the direction of the arrows 3—3 of FIGURE 2;

FIGURE 4 is a front elevation of the valve gate, in its unmounted condition;

FIGURE 5 is a right end view of the same;

FIGURE 6 is a front elevation of the unmounted pressure clamp;

FIGURE 7 is a right end view of the same;

FIGURE 8 is an enlarged view, partly in section of one of the pivot bearing mounts of the pressure clamp, showing the clamp in alternate positions;

FIGURE 9 is a horizontal, sectional view, taken along the line and in the direction of the arrows 9—9 of FIGURE 3;

FIGURE 10 is a schematic layout of the electrical circuits showing them in their gate opening or non-flooded condition;

FIGURE 11 is an end view of the motor case; and

FIGURE 12 is a schematic layout of the electrical circuits showing them in their gate closing, or flooded condition.

Referring more particularly to the drawings, there is seen in FIGURE 1 the electronically controlled backwater valve that is the subject of this invention, broadly indicated by reference numeral 20.

The valve 20 comprises a hollow housing 21 having a central chamber 34 with inlet and outlet pipes 24 and 25, respectively. The housing is located at a convenient place in the building sewer line with building side of the line connected to the inlet pipe 24 and the street sewer connected to the outlet pipe in such a manner that the building sewage will flow through the chamber 34 by gravity into the street sewer.

The housing 21 has a collar through which the interior of the valve can be reached for adjustment and servicing. The collar is closed by cover 23, and its length is such that the cover 23 will be flush with the basement floor beneath which the sewer is buried.

The housing 21 is preferably made of cast iron or steel, while the hereinafter described valve seat gate, and other operative parts are made of non-corrosive metals such as bronze or stainless steel.

Reference numeral 26 indicates a bronze valve seat ring set in the end of the inlet pipe 24.

A gate 30 is slidably mounted over the seat 26 between spaced guide rails 27 and 28. The gate comprises a flat sheet of stainless steel, substantially rectangular in shape, and of a size to slide vertically between guide rails, 27 and 28, against the valve seat 26, to cover same and seal-off entrance to the inlet pipe 24, when in its closed position, as seen in FIGURES 2 and 3.

The lower edge of the gate 30 is tapered toward its valve seat contacting, or front face, to define a knife edge 31, which rides against the valve seat 26 as the gate 30 moves up and down between the guide rails 27 and 28. The knife edge 31 of the descending gate will cut through any fibrous debris laying across the valve seat 26, thereby assuring proper closing of the valve at all times and doing away with the necessity for periodic inspection and cleaning of the valve.

A toothed rack 29 is mounted on the back face of the gate 30 in running engagement with the pinion gear 49 of the gate operating motor 48 which is mounted in a water-tight case 50, supported on bracket 56, as seen most clearly in FIGURES 2 and 3.

Reference numeral 35 indicates a clamp plate having spaced arms 36 and 37, bearing resilient pressure fingers 42, 43, 44 and 45, as seen most clearly in FIGURES 6 and 7. These pressure fingers are shown as comprising a helix of edge-wound flat spring steel, having a flat end that can be brought to bear squarely against the back face of the gate 30. It is to be understood that the fingers may take other forms, but the resilient feature is desirable to compensate for slight play or misalignment of the parts due to wear.

A pivot axle 40 extends longitudinally of the clamp plate 35.

Reference numeral 38 indicates a laterally extending lever arm formed integral with the clamp plate 35 immediately adjacent and parallel to the axle 40.

The clamp plate axle 40 is mounted between bearing blocks 39 and 41, located below the guide rails 28 and 27, respectively.

When the clamp plate 35 is so mounted, its lever arm 38 extends into the vertical line of travel of the valve gate 30, as is seen most clearly in FIGURE 8, and the whole structure is free to pivot or tilt on axle 40 toward or away from the gate 30 between positions indicated by reference numerals 37 and 37a, respectively, as seen in FIGURE 8. Backward tilting of the clamp plate 35 is limited by stop pins 46 and 47 located on bearing blocks 39 and 41, respectively.

When the descending lower edge 31 of the gate reaches the lever arm 38, the clamp plate arms 36 and 37 are tilted toward the gate to bring their fingers 42, 43, 44 and 45 into pressed engagement against the back face of the gate 30. As the descent of the gate continues, the lever arm 38 is tilted to a horizontal position when the gate reaches its fully closed position, whereat the gate 30 is subjected to maximum pressure by the clamp fingers 42, 43, 44 and 45, to seat it firmly against the valve seat 26. Thus the gate may be fitted loosely between the guide rails 27 and 28, to permit easy raising and lowering thereof, but at the moment of full closure a tight fit against the valve seat 26 is assured, due to the automatic action of the clamp fingers.

Reference numerals 51 and 52, as seen most clearly in FIGURE 11, indicate micro-switches mounted in the motor case 50 with their activating buttons 52 and 54, respectively, extending through the top and bottom of the case in alignment with the travel path of limit pins 32 and 33 mounted on the gate rack 29 and which are adapted to trip the micro-switch fingers 52 and 54 at the end of their travel paths, as the rack moves down or up.

The entire case 50, including the micro-switch buttons 52 and 54, is encapsulated in a water-proof plastic envelope 55, which has flexible areas at the buttons 52 and 54 to permit the buttons to be actuated through the envelope.

The shaft of the pinion gear 49 is fitted through a water-tight sleeve so that the entire case 50 can be submerged without damage to its contents.

The motor 48 operates on 6 volts, direct current, and is of the type that can be reversed by reversing the direction of the current in the supply lines. It operates at 1800 r.p.m. and is connected to the pinion 49 through a 3,000-1 gear reduction system in order to obtain a very powerful torque at the pinion gear 49.

A water level sensing electrode 60 is mounted in chamber 34 of the valve housing 21, as seen in FIGURES 2 and 3.

The electrode 60 is supported by bracket 58 through an insulating bushing 59, so that it is electrically isolated from the metal of the housing 21. The bottom end of the electrode is positioned at the approximate center line of the sewer outlet pipe 25 so that it will be above the level of the sewage flow, under normal conditions. However, when back-flow raises the liquid level to the electrode 60, the hereinafter described valve closing circuit will be activated automatically, before any flooding of the protected building can occur.

A multi-conductor cable 72 connects a socket 71, in the housing cover 23, to the motor and switches in case 50 through a separable water-proof plug 57 and also to the electrode 60 through a separable cap 73, as seen in FIGURE 3.

The cover 23 rests on a sealing gasket 74 and is drawn up tightly thereagainst by bolts 75. Thus the entire housing chamber 34 and neck 22 can be filled with back-up sewage without any leakage to the outside, or damage to the electrical circuits.

The electronic control box 69, containing the circuits shown in FIGURES 10 and 12, may be located at any convenient spot in the building and its circuits connected to the valve cover socket 71 through a suitable cable, whereby the components housed in the valve housing 21 become operable through control box 69.

The electronic circuits for controlling the closing and opening of the valve gate 30 are shown in FIGURES 10 and 12, respectively.

Reference numeral 61 indicates a double pole, double throw relay switch operable by a 6 volt storage battery through a transistorized amplifying circuit 63 that is connected on one side to the moisture sensing electrode 60 and on the other side to the valve housing 21 which acts as a ground.

The D.C. motor 48 is of the type that can be reversed by reversing the polarity of the leads 64 and 65, which are connected to relay switch arms 66 and 67, respectively.

The micro-switches 51 and 53 are of the normally closed circuit type.

Reference numeral 68 indicates a second 6 volt, storage battery which furnishes current to the motor 48.

Both batteries 62 and 68 are kept charged by a trickle charger, not shown, mounted in the box 69.

The batteries have a capacity such that they can operate the valve 20 independent of the building power source for as long as 24 hours, during a power failure such as might occur during a storm which produces flooding conditions.

When sewage conditions are normal, the electrode 60 will not be reached by water in the chamber 34 and therefore the control circuit of the relay 61 will be incomplete and the relay will be in the inactive condition illustrated in FIGURE 12, wherein the switch arms 66 and 67 are in their first or released positions.

As seen in FIGURE 12, lead 64 of motor 48 is connected to the negative side of battery 68 through relay switch arm 66 and micro-switch 53. At the same time lead 65 is connected directly to the positive side of battery 68 through relay switch arm 67, thereby completing the motor circuit, causing the motor to rotate the pinion gear 49 and raise the valve gate to its open position.

As the gate 30 reaches its fully open position, the limit pin 33 of the gate rock 29 depresses the control button 54 of micro-switch 53, thus opening the circuit and stopping the motor with the gate 30 in its fully raised position, giving free passageway from the inlet pipe 24 through the chamber 34 to the outlet pipe 25. This is the condition of the circuit when drainage conditions are normal.

FIGURE 10 illustrates conditions when flooding has backed up the sewage to a point where the water level 70 touches the lower end of the sensing electrode 60.

The relay control circuit is now completed between the electrode 60 and the valve housing 21 through the water 70. Activation of relay 61 causes the switch arms 66 and 67 to be moved to their second positions wherein switch arm 66 connects motor lead 64 to the positive side of battery 68 through micro-switch 51, and switch arm 67 connects motor lead 65 directly to the negative side of battery 68.

It will be noted from a comparison of FIGURES 10 and 12 that the polarity of motor leads 64 and 65 are now reversed which causes the motor 48 to reverse its direction or rotation, to lower the gate 30.

At the moment the gate 30 reaches the fully closed position shown in FIGURE 3, the limit pin 32 of the gate rack 29 depresses the control button 52 of micro-switch 51, thus opening the motor circuit and stopping the motor with the gate 30 in its fully closed position; sealing off the building side of valve, or pipe 24, from the backed up sewage, which fills the chamber 34.

When the water-level in valve chamber 34 falls below the end of sensing electrode 60, to re-establish the conditions illustrated in FIGURE 12, the de-energized relay 61 permits the switch arms 66 and 67 to return to their first positions, whereupon the motor 48 reverses itself to raise the gate 30 and permit resumption of normal outflow of sewage from the protected building.

These opening and closing cycles will automatically repeat themselves in response to changes in the sewage depth in the valve housing chamber 34.

It will now be clear that there is provided a device which accomplishes the objectives heretofore set forth.

While the invention has been disclosed in its preferred form, it is to be understood that the specific embodiment thereof as described and illustrated herein is not to be considered in a limited sense, as there may be other

I claim:

1. An electronically controlled backwater valve, comprising in combination, a housing including a valve chamber having inlet and outlet ports; a valve seat surrounding the inlet port; paired vertical guide members positioned in the chamber adjacent opposite edges of said valve seat; a gate member having a toothed rack, reciprocally movable between said guide members across the face of the valve seat; a reversible electric motor mounted in the chamber, geared to the gate rack, having electronic control circuits responsive to the water level in the chamber, and adapted to raise and maintain the gate in a first position, clear of the inlet port valve seat, during normal conditions, and to lower and maintain the gate in a second position, covering the valve seat and inlet port, under flood conditions, whereby backwater is prevented from reaching the inlet port. and clamp means tiltably mounted in the valve chamber, engageable by the gate when in its second position, to tilt and press against the gate and clamp same against the valve seat to prevent fluid leakage between the gate and seat.

2. An electronically controlled backwater valve, comprising in combination, a housing including a valve chamber having inlet and outlet ports; a valve seat surrounding the inlet port; paired vertical guide members positioned in the chamber adjacent opposite edges of said valve seat; a gate member having a toothed rack, reciprocally movable between said guide members across the face of the valve seat; a reversible electric motor mounted in the chamber, geared to the gate rack, having electronic control circuits responsive to the water level in the chamber, and adapted to raise and maintain the gate in a first position, clear of the inlet port valve seat, during normal conditions, and to lower and maintain the gate in a second position, covering the valve seat and inlet port, under flood conditions, whereby backwater is prevented from reaching the inlet port, and a U shaped clamp member hingedly mounted in the chamber between the guide members, immediately below the valve seat, having spaced upright arms and a laterally extending lever foot positioned in the travel path of the gate, the arms having laterally extending fingers mounted thereon, faced toward the gate; the clamp member being normally in a first position wherein its arms and fingers are clear of the gate when the gate is in its first position, the lever foot being engaged by and urged downward by the lower edge of the gate when the gate is in its second position, to tilt and hold the clamp arms in a second position wherein the clamp fingers press against the gate to clamp same against the valve seat to prevent fluid leakage between the gate and seat.

3. An electronically controlled backwater valve, comprising in combination, a housing including a valve chamber having inlet and outlet ports; a valve seat surrounding the inlet port; paired vertical guide members positioned in the chamber adjacent opposite edges of said valve seat; a gate member having a lower knife edge and a vertically extending toothed rack, reciprocally movable between the guide members, across the face of the valve seat; a reversible electric motor mounted in the chamber, geared to the gate rack, having electronic control circuits responsive to the water level in the chamber, and adapted to raise and maintain the gate in a first position, clear of the inlet port valve seat, during normal conditions, and to lower and maintain the gate in a second position, covering the valve seat and inlet port, under flood conditions, whereby backwater is prevented from reaching the inlet port; and, a U-shaped clamp member hingedly mounted in the chamber between the guide members, immediately below the valve seat, having spaced upright arms and a laterally extending lever foot positioned in the travel path of the gate, the arms having laterally extending resilient fingers mounted thereon, faced toward the gate; the clamp member being normally in a first position wherein its arms and resilient fingers are clear of the gate when the gate is in its first position, the lever foot being engaged by and urged downward by the knife edge of the gate when the gate is in its second position, to tilt and hold the clamp arms in a second position wherein the resilient clamp fingers press against the gate to clamp same against the valve seat to prevent fluid leakage between the gate and seat.

4. An electronically controlled backwater valve, comprising in combination, a housing including a valve chamber having inlet and outlet ports; a valve seat surrounding the inlet port; paired vertical guide members positioned in the chamber adjacent opposite edges of said valve seat; a gate member having a toothed rack, reciprocally movable between said guide members across the face of the valve seat, the rack having laterally extending and spaced limit pins positioned proximate the upper and lower ends thereof; a water-tight motor case mounted in the chamber proximate the travel path of the gate rack; a reversible electric motor, including a speed reduction gear system, mounted in the case with its drive pinion meshed with the gate rack teeth; a first, normally closed, micro-switch mounted in the case with its plunger extended through the wall thereof in the travel path of the lower rack limit pin; a second, normally closed, microswitch mounted in the case with its plunger extended through the wall thereof in the travel path of the upper rack limit pin; a water-tight flexible envelope jacketing the case and plungers; an electronic control circuit for the motor, including said first and second micro-switches, responsive to the water level in the chamber, and adapted to activate the motor to raise and stop the gate in a first position, clear of the inlet port valve seat, when its lower rack limit pin engages the first micro-switch plunger to open the motor circuit, during normal conditions, and to lower and stop the gate in a second position, under flood conditions, covering the valve seat and inlet port, when the upper rack limit pin engages the second micro-switch plunger, to open the motor circuit, whereby backwater is prevented from reaching the inlet port; and a U shaped clamp member hingedly mounted in the chamber between the guide members, immediately below the valve seat, having spaced upright arms and a laterally extending lever foot positioned in the travel path of the gate, the arms having laterally extending fingers mounted thereon, faced toward the gate; the clamp member being normally in a first position wherein its arms and fingers are clear of the gate when the gate is in its first position, the lever foot being engaged and urged downward by the lower edge of the gate when the gate is in its second position, to tilt and hold the clamp arms in a second position wherein the clamp fingers press against the gate to clamp same against the valve seat, to prevent fluid leakage between the gate and valve seat.

5. A device of the type defined in claim 4 and further distinguished by the electronic control system comprising, a first circuit, including a first low voltage storage battery connected to the motor through a relay operated current reversing switch in series with the aforesaid first and second micro-switches mounted in the motor case; a second circuit, including a second low voltage storage battery, connected at one pole, through a transistorized current amplifier, to the actuating coil of the first circuit current reversing switch and terminating in a water level sensing electrode suspended in the valve housing chamber in electrical isolation therefrom; the other pole of the battery being grounded to the valve housing; and tricklecharger means permanently connected to the first and second storage batteries; the second circuit being opened, under normal conditions, at the water level sensing electrode, leaving the relay in its inactivated condition, wherein the first circuit is set up to activate the motor to raise the gate to its first position, clear of the inlet port valve seat; the second circuit being completed, under flood conditions, between the electrode and the valve housing wall through the flood water in the chamber to activate the relay coil of the current reversing switch in the first circuit, thereby reversing the current in the first circuit and causing the motor to reverse itself and lower the gate to its second position, whereat it covers the valve seat and inlet port.

References Cited in the file of this patent

UNITED STATES PATENTS 2,059,635    Fillo _____ Nov. 3, 1936